(12) United States Patent
Budd et al.

(10) Patent No.: US 9,915,784 B2
(45) Date of Patent: Mar. 13, 2018

(54) OPTICAL WAVEGUIDE STRUCTURE WITH WAVEGUIDE COUPLER TO FACILITATE OFF-CHIP COUPLING

(71) Applicant: International Business Machines Corporation, Armonk, NY (US)

(72) Inventors: Russell A. Budd, North Salem, NY (US); Fuad E. Doany, Katonah, NY (US); Christopher V. Jahnes, Upper Saddle River, NJ (US); Benjamin G. Lee, New York, NY (US); Laurent Schares, Sleepy Hollow, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/819,531

(22) Filed: Aug. 6, 2015

(65) Prior Publication Data
US 2015/0346431 A1  Dec. 3, 2015

Related U.S. Application Data

(63) Continuation of application No. 14/019,518, filed on Sep. 5, 2013, now Pat. No. 9,103,972.

(51) Int. Cl.
*G02B 6/12* (2006.01)
*G02B 6/26* (2006.01)
(Continued)

(52) U.S. Cl.
CPC ............ *G02B 6/26* (2013.01); *G02B 6/12* (2013.01); *G02B 6/12002* (2013.01);
(Continued)

(58) Field of Classification Search
USPC .......................................... 385/14
See application file for complete search history.

(56) References Cited

U.S. PATENT DOCUMENTS

| 7,016,560 B2 * | 3/2006 | Ticknor | G02B 26/005 385/15 |
| 7,599,585 B2 | 10/2009 | Blauvelt et al. | |

(Continued)

FOREIGN PATENT DOCUMENTS

| CN | 101498813 A | 8/2009 |
| CN | 101498814 A | 8/2009 |

(Continued)

OTHER PUBLICATIONS

G.L. Bona et al., SiON highrefractive-index waveguuide and planar lightwave circuits, IBM Journal of Research and Development vol. 47, Issue: 2.3,Mar. 2003, pp. 239-249.

*Primary Examiner* — Eric Wong
(74) *Attorney, Agent, or Firm* — Daniel P. Morris; Otterstedt, Ellenbogen & Kammer, LLP (57) ABSTRACT

Aspects of the invention are directed to a method for forming an optical waveguide structure. Initially, a base film stack is received with an optical waveguide feature covered by a lower dielectric layer. An etch stop feature is then formed on the lower dielectric layer, and an upper dielectric layer is formed over the etch stop feature. Subsequently, a trench is patterned in the upper dielectric layer and the etch stop feature at least in part by utilizing the etch stop feature as an etch stop. Lastly, a waveguide coupler feature is formed in the trench, at least a portion of the waveguide coupler feature having a refractive index higher than the lower dielectric layer and the upper dielectric layer. The waveguide coupler feature is positioned over at least a portion of the optical waveguide feature but is separated from the optical waveguide feature by a portion of the lower dielectric layer.

20 Claims, 6 Drawing Sheets

(51) Int. Cl.
 *G02B 6/136* (2006.01)
 *G02B 6/30* (2006.01)
 *G02B 6/132* (2006.01)
 *G02B 6/28* (2006.01)

(52) U.S. Cl.
 CPC ......... *G02B 6/12004* (2013.01); *G02B 6/132* (2013.01); *G02B 6/136* (2013.01); *G02B 6/305* (2013.01); *G02B 6/2821* (2013.01)

(56) References Cited

U.S. PATENT DOCUMENTS

| | | | |
|---|---|---|---|
| 7,738,753 B2 | 6/2010 | Assefa et al. | |
| 7,811,844 B2 | 10/2010 | Carothers et al. | |
| 8,106,379 B2 | 1/2012 | Bowers | |
| 2009/0324163 A1 | 12/2009 | Dougherty et al. | |
| 2011/0102777 A1* | 5/2011 | Zinoviev | G01N 21/41 356/128 |
| 2012/0314993 A1 | 12/2012 | Kang et al. | |
| 2013/0064514 A1* | 3/2013 | Peng | G11B 5/3133 385/124 |
| 2013/0209112 A1 | 8/2013 | Witzens | |
| 2014/0140659 A1* | 5/2014 | Demaray | G02B 6/132 385/28 |
| 2014/0334768 A1* | 11/2014 | Chang | G02B 6/12 385/14 |
| 2015/0063768 A1 | 3/2015 | Budd et al. | |

FOREIGN PATENT DOCUMENTS

| | | |
|---|---|---|
| CN | 102487046 A | 6/2012 |
| EP | 1446687 B1 | 8/2004 |
| JP | 2011027769 A | 2/2011 |

* cited by examiner

OPTICAL WAVEGUIDE STRUCTURE WITH WAVEGUIDE COUPLER TO FACILITATE OFF-CHIP COUPLING

CROSS-REFERENCE TO RELATED APPLICATIONS

This is a continuation application of application Ser. No. 14/019,518, filed Sep. 5, 2013, the complete disclosure of which is expressly incorporated by reference herein in its entirety for all purposes.

STATEMENT OF GOVERNMENT RIGHTS

This invention was made with Government support under Contract No.: W911NF-12-2-0051 awarded by Defense Advanced Research Projects Agency (DARPA). The Government has certain rights in this invention.

FIELD OF THE INVENTION

The present invention relates to the electrical, electronic and computer arts, and, more particularly, to integrated circuits including optical waveguides.

BACKGROUND OF THE INVENTION

Silicon photonic integrated circuits are of great interest because they provide ultra-fast data transfer while also being capable of being fabricated utilizing existing semiconductor fabrication techniques. Silicon photonic integrated circuits typically comprise one or more lasers, modulators, and photodetectors. Integrated optical waveguides provide communications pathways with off-chip optical elements such as optical fibers and other photonic devices. Presently, emerging silicon photonic integrated circuits employ single mode silicon-based optical waveguides with dimensions on the order of 0.2×0.5 micrometers. Because of their small dimensions, achieving efficient coupling between these waveguides and off-chip optical elements remains challenging. Such coupling typically requires very precise alignment to achieve efficient optical intercommunications.

SUMMARY OF THE INVENTION

Embodiments of the invention provide silicon photonic integrated circuits with waveguide coupler features that are optically coupled to optical waveguides in the integrated circuits. Because of their relatively large size compared to the optical waveguides, the waveguide coupler features enable relaxed tolerances for coupling the silicon photonic integrated circuits to off-chip devices such as optical fibers.

Aspects of the invention are directed to a method for forming an optical waveguide structure. Initially, a base film stack is received with an optical waveguide feature covered by a lower dielectric layer. An etch stop feature is then formed on the lower dielectric layer, and an upper dielectric layer is formed over the etch stop feature. Subsequently, a trench is patterned in the upper dielectric layer and the etch stop feature at least in part by utilizing the etch stop feature as an etch stop. Lastly, a waveguide coupler feature is formed in the trench, at least a portion of the waveguide coupler feature having a refractive index higher than the lower dielectric layer and the upper dielectric layer. The waveguide coupler feature is positioned over at least a portion of the optical waveguide feature but is separated from the optical waveguide feature by a portion of the lower dielectric layer.

Additional aspects of the invention are directed to an optical waveguide structure formed at least in part by a plurality of processing steps. Initially, a base film stack is received with an optical waveguide feature covered by a lower dielectric layer. An etch stop feature is then formed on the lower dielectric layer, and an upper dielectric layer is formed over the etch stop feature. Subsequently, a trench is patterned in the upper dielectric layer and the etch stop feature at least in part by utilizing the etch stop feature as an etch stop. Lastly, a waveguide coupler feature is formed in the trench, at least a portion of the waveguide coupler feature having a refractive index higher than the lower dielectric layer and the upper dielectric layer. The waveguide coupler feature is positioned over at least a portion of the optical waveguide feature but is separated from the optical waveguide feature by a portion of the lower dielectric layer.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described with reference to illustrative embodiments. For this reason, numerous modifications can be made to these embodiments and the results will still come within the scope of the invention. No limitations with respect to the specific embodiments described herein are intended or should be inferred.

As used herein, the term "silicon oxide" is intended to describe a material consisting essentially of silicon and oxygen, and having the chemical formula $Si_xO_y$. The term "silicon oxide" would therefore include, but not be limited to, a material with the chemical formula $SiO_2$ (i.e., silicon dioxide). The term "silicon nitride," moreover, is intended to describe a material consisting essentially of silicon and nitrogen, and having the chemical formula $Si_xN_y$. The term "silicon nitride" would therefore include, but not be limited to, a material with the chemical formula $Si_3N_4$. Finally, the term "silicon oxynitride" is intended to describe a material consisting essentially of silicon, oxygen, and nitrogen, and having the chemical formula $Si_xN_yO_z$. The term "silicon oxynitride" would, as a result, include, but not be limited to, a material with the chemical formula $Si_2N_2O$.

Figure 1A:
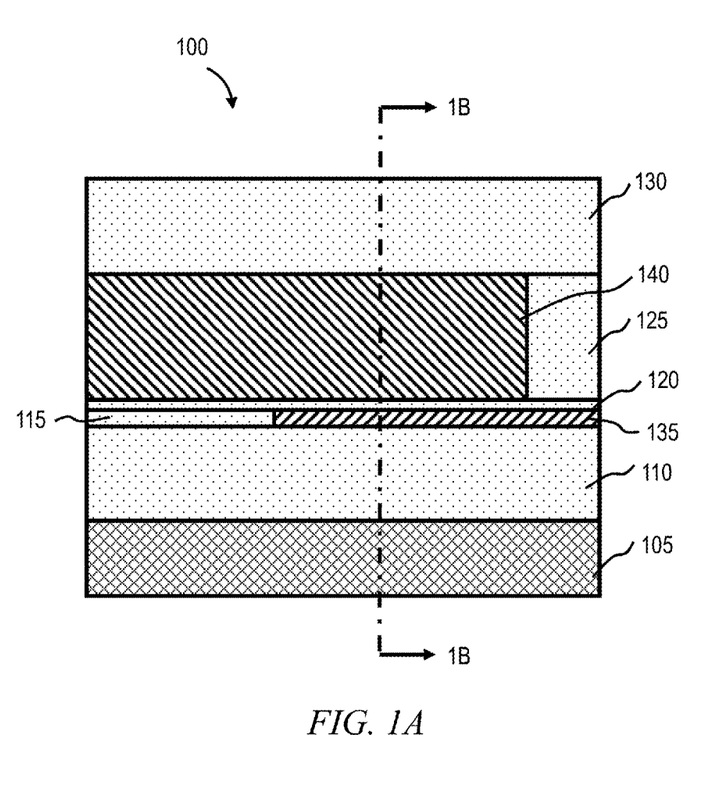
FIGS. 1A and 1B show sectional views of a portion of an integrated circuit in accordance with an illustrative embodiment of the invention.
Figure 1B:
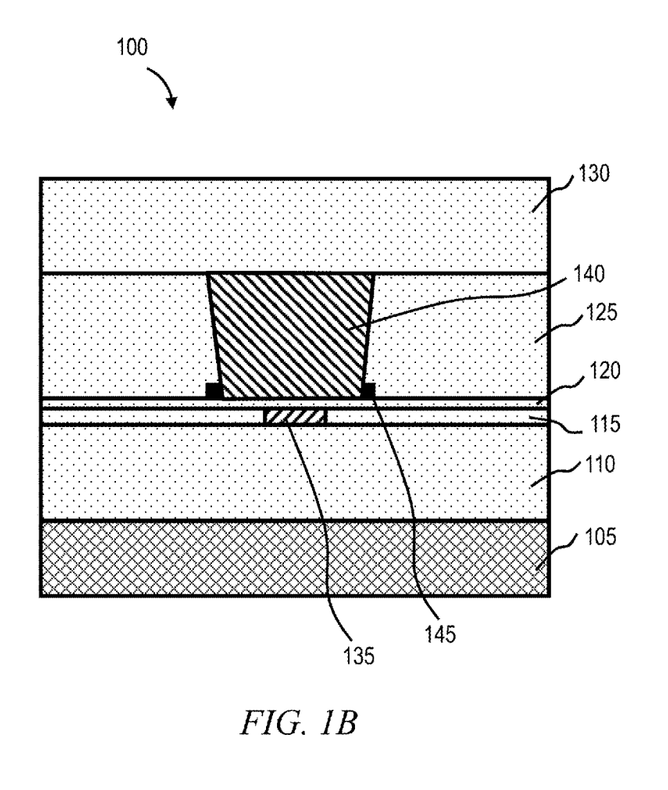

FIGS. 1A and 1B show sectional views of a portion of an integrated circuit 100 (more generally, an "optical waveguide structure") in accordance with an illustrative embodiment of the invention. A silicon layer 105 forms the base of the integrated circuit 100. A first dielectric layer 110, a second dielectric layer 115, a third dielectric layer 120, a fourth dielectric layer 125, and a fifth dielectric layer 130 are stacked on the silicon layer 105. An optical waveguide feature 135 and a waveguide coupler feature 140 are built into these dielectric layers 110, 115, 120, 125, 130. The waveguide coupler feature 140 is positioned above an end of the optical waveguide feature 135, but is separated therefrom by the third dielectric layer 120. A bottom region of the waveguide coupler feature 140 is flanked by what remains of an etch stop feature 145, the purpose of which will be further elucidated below.

A purpose of the waveguide coupler feature 140 in the integrated circuit 100 is to relax the alignment tolerances between the integrated circuit 100 and an off-chip device such as an optical fiber, laser, light emitting diode (LED), photodetector, or optical amplifier. Within the integrated circuit 100, the waveguide coupler feature 140 is able to receive light signals from and transmit light signals to the optical waveguide feature 135. At the same time, the waveguide coupler feature 140 is also able to transmit light signals to and receive light signals from external devices. By allowing the larger waveguide coupler feature 140 to transmit light from the optical waveguide feature 135 to off-chip devices, and vice versa, the alignment tolerances between the integrated circuit 100 and the off-chip devices is reduced while coupling efficiency is maintained.

Figure 2:
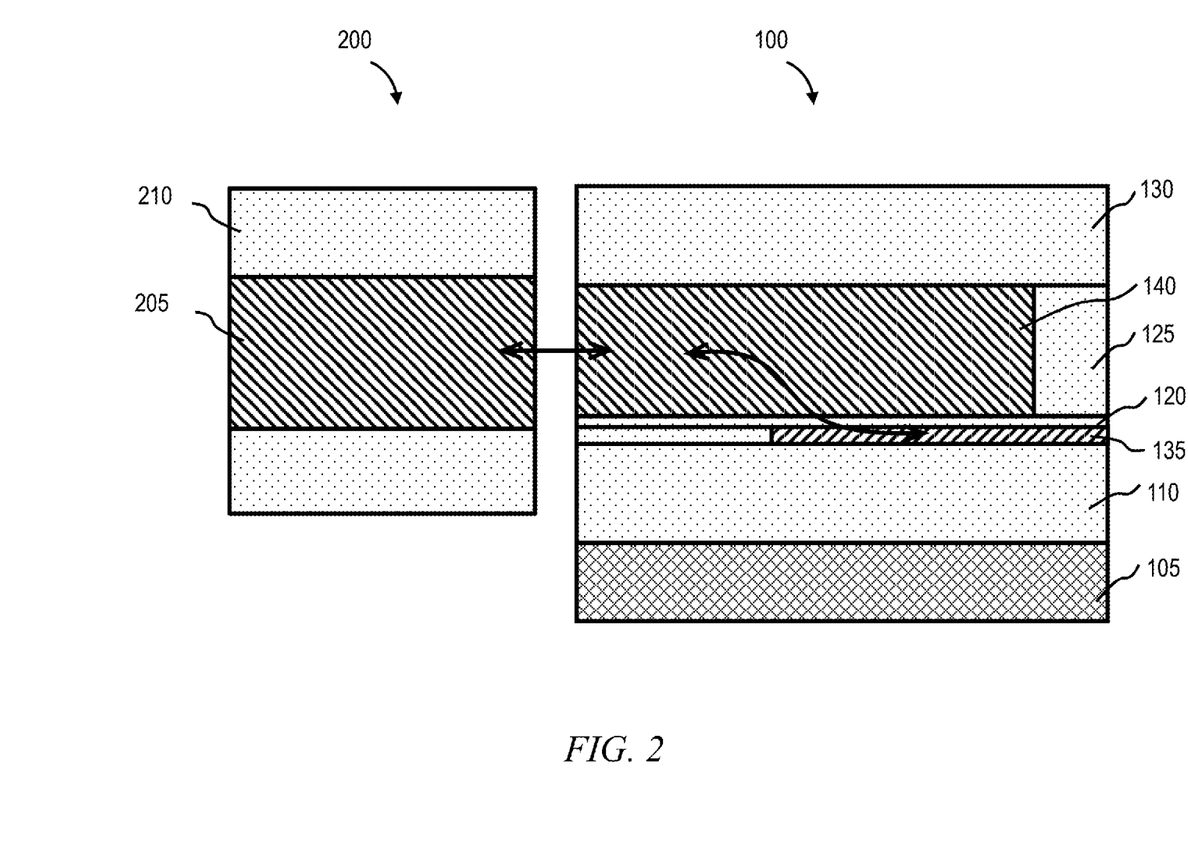
FIG. 2 shows a sectional view of the FIG. 1 integrated circuit portion coupled to an off-chip optical fiber.

FIG. 2 shows a sectional view of the integrated circuit 100 coupled to an off-chip optical fiber 200 (with a core 205 and a cladding 210). In the figure, the propagation of light signals is represented by arrows. Light received from the optical fiber 200 is routed by the waveguide coupler feature 140 into the optical waveguide feature 135 in the integrated circuit 100. Correspondingly, light emitted from the optical waveguide feature 135 is routed by the waveguide coupler feature 140 into the optical fiber 200. The relatively large size of the waveguide coupler feature 140 in comparison to the optical waveguide feature 135 eases the alignment tolerances between the integrated circuit 100 and the optical fiber 200 compared to what would be required if one were trying to couple the smaller optical waveguide feature 135 to the optical fiber 200 directly.

In accordance with aspects of the invention, at least a portion of the waveguide coupler feature 140 preferably has a higher refractive index than the dielectric layers surrounding it (i.e., the third dielectric layer 120, the fourth dielectric layer 125, and the fifth dielectric layer 130). By way of example, if, in one or more embodiments, the dielectric layers 120, 125, 130 consist essentially of silicon oxide, the waveguide coupler feature 140 may consist essentially of silicon oxynitride. By changing the ratio of nitrogen to oxygen in silicon oxynitride, the refractive index of the material may readily be tuned between about 1.45 and about 2.00 (with silicon dioxide having a refractive index of about 1.45). The optical waveguide feature 135, may, in one or more embodiments, consist essentially of silicon or silicon nitride. The etch stop feature 145 may, in one or more embodiments, consist essentially of silicon nitride.

Figure 3:
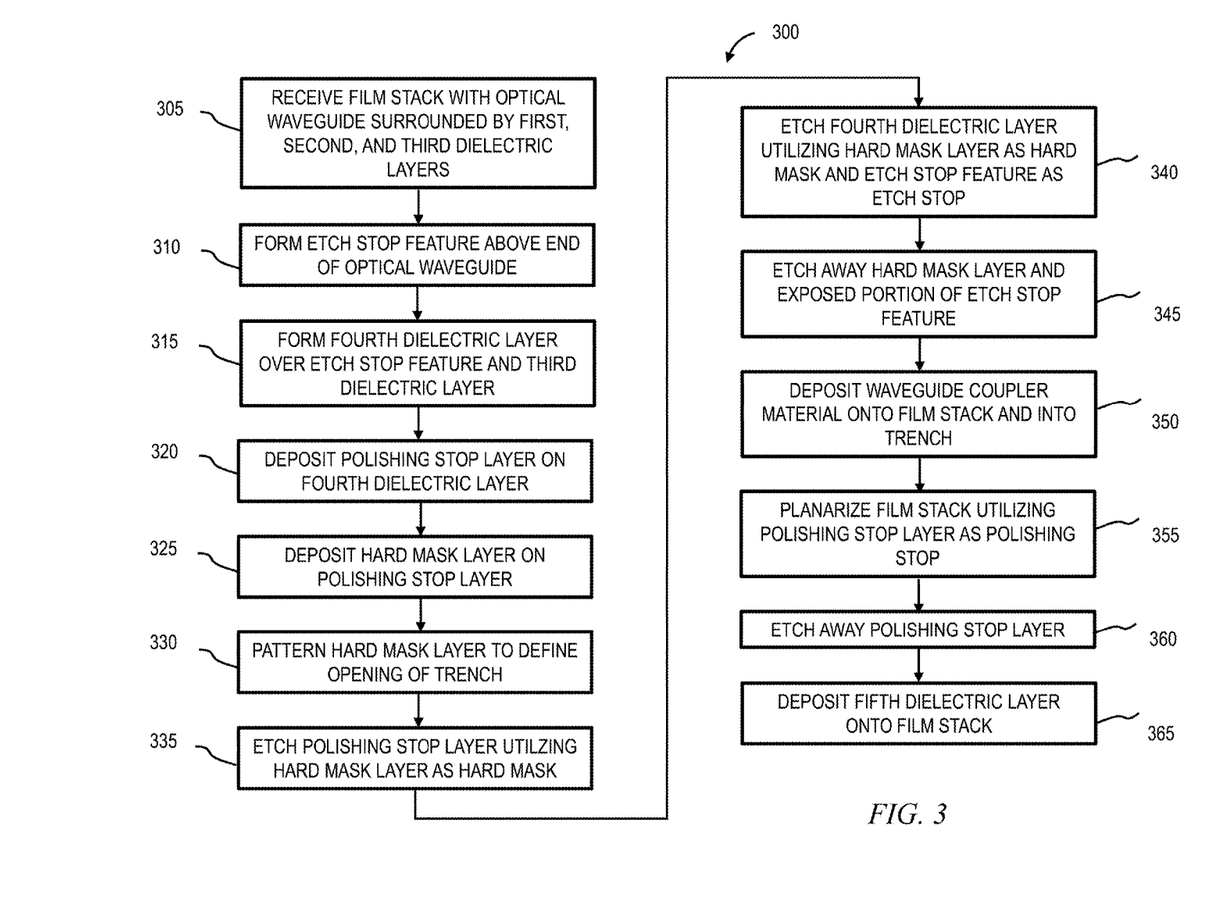
FIG. 3 shows a flow diagram of a method for forming the FIG. 1 integrated circuit, in accordance with an illustrative embodiment of the invention.

FIG. 3 shows a flow diagram of a method 300 in accordance with an illustrative embodiment of the invention for forming the integrated circuit 100, while FIGS. 4A-4K show sectional views of intermediate film stacks formed during the processing. Although the method 300 and the structures formed thereby are entirely novel, many of the individual processing steps may be implemented utilizing conventional semiconductor fabrication techniques and conventional semiconductor fabrication tooling. These techniques and tooling will already be familiar to one having ordinary skill in the relevant arts. Moreover, many of the processing steps and tooling used to fabricate semiconductor devices are also described in a number of readily available publications, including, for example: R. N. Tauber et al., *Silicon Processing for the VLSI Era, Volume* 1, Lattice Press, 2000; and Y. Nishi et al., *Handbook of Semiconductor Manufacturing Technology, Second Edition*, CRC Press, 2007, both of which are hereby incorporated by reference herein. In setting forth the method 300, it is emphasized that the method 300 is not intended to encompass all of the processing steps which may be required to successfully form a functional device. Rather, certain processing steps which are conventionally used in forming integrated circuit devices, such as, for example, wet cleaning and annealing steps, are purposefully not described herein for economy of description. However one skilled in the art will readily recognize those processing steps omitted from this more generalized description.

Figure 4A:
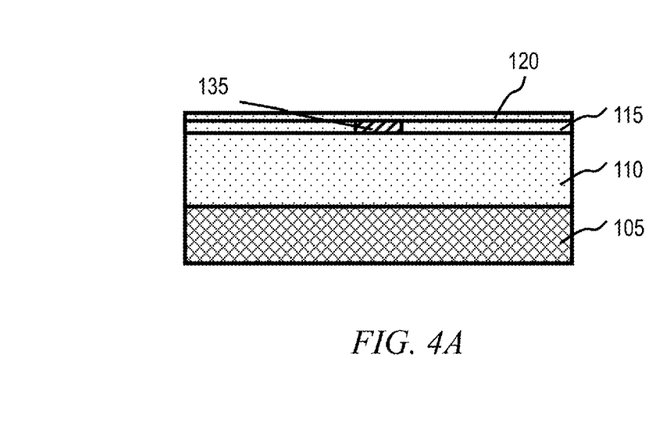
FIGS. 4A-4K show sectional views of intermediate film stacks formed when implementing the FIG. 3 method to form the FIG. 1 integrated circuit.

The method 300 starts in step 305 with the film stack shown in FIG. 4A. The film stack comprises the silicon layer 105 and the optical waveguide feature 135, as well as the first dielectric layer 110, the second dielectric layer 115, and the third dielectric layer 120. In one or more embodiments, the first dielectric layer 110 (e.g., silicon oxide) may be deposited on the silicon layer 105 by chemical vapor deposition (CVD), and then a layer of material for the optical waveguide feature 135 (e.g., silicon or silicon nitride) may be deposited on the first dielectric layer 110, also by CVD. The layer of material for the optical waveguide feature 135 may then be patterned to define the optical waveguide feature 135 by photolithography and reactive ion etching (RIE). The RIE process preferably etches the material forming the optical waveguide feature 135 (e.g., silicon or silicon nitride) relatively rapidly, while etching the materials forming the photoresist and the first dielectric layer 110 (e.g., silicon oxide) relatively slowly. So formed, the second dielectric layer 115 (e.g., silicon oxide) may be deposited by CVD on the first dielectric layer 110 and the optical waveguide feature 135, and then planarized by chemical mechanical polishing (CMP). After planarization, the third dielectric layer 120 (e.g., silicon oxide) may be deposited on the second dielectric layer 115 by CVD to yield the film stack shown in FIG. 4A. The third dielectric layer 120 is preferably relatively thin in comparison to the other layers to allow efficient light coupling between the optical waveguide feature 135 and the overlying waveguide coupler feature 140 that will be formed in subsequent processing (see FIG. 2).

Figure 4B:
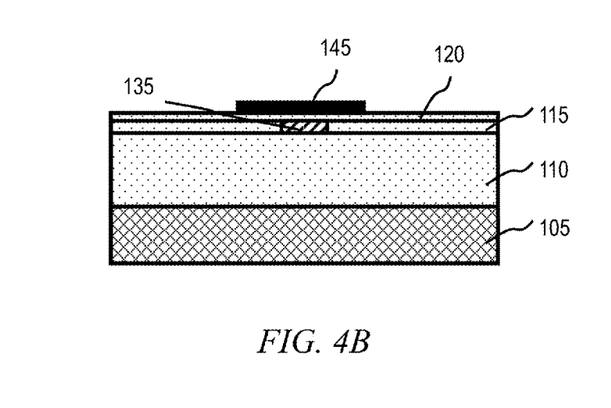

Step 310, in turn, comprises forming the etch stop feature 145 (e.g., silicon nitride) above an end of the optical waveguide feature 135. The etch stop feature 145 may be formed by depositing a layer of material for the etch stop feature 145 on the third dielectric layer 120, and then patterning that layer of material by photolithography and RIE. The RIE process preferably has a relatively high etch rate in the material forming the etch stop feature 145 (e.g., silicon nitride) and a relatively slow etch rate in the material forming the third dielectric layer 120 (e.g., silicon oxide). The resultant film stack is shown in FIG. 4B.

Figure 4C:
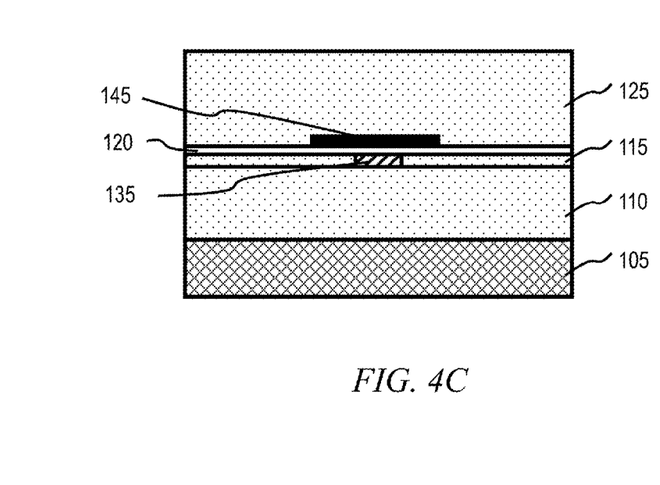

Next, in step 315, the fourth dielectric layer 125 is formed over the etch stop feature 145 and the third dielectric layer 120 to yield the film stack shown in FIG. 4C. The fourth dielectric layer 125 may be deposited by CVD and planarized by CMP (if necessary).

Figure 4D:
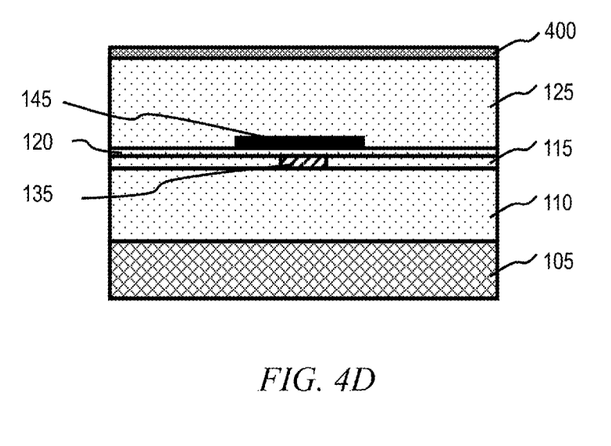

In step 320, a polishing stop layer 400 is deposited on the fourth dielectric layer 125 to yield the film stack shown in FIG. 4D. In one or more embodiments, the polishing stop layer 400 may, for example, comprise diamond-like carbon (DLC). The DLC may be deposited by, for example, plasma-enhanced CVD. Because of its hardness, DLC is an excellent polishing stop layer 400 for CMP.

Figure 4E:
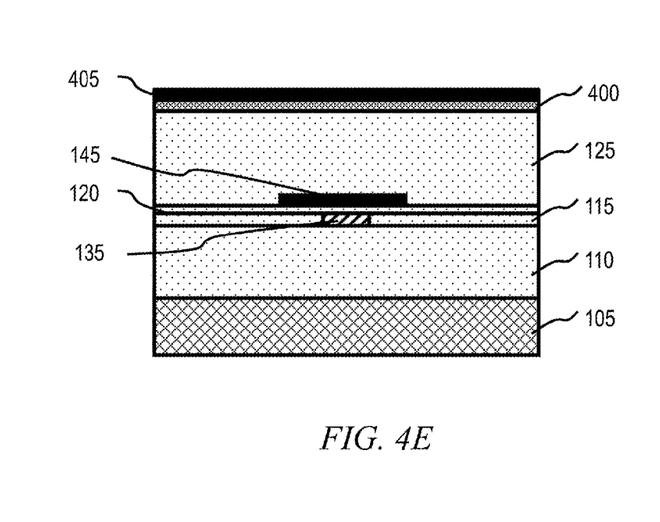
Figure 4F:
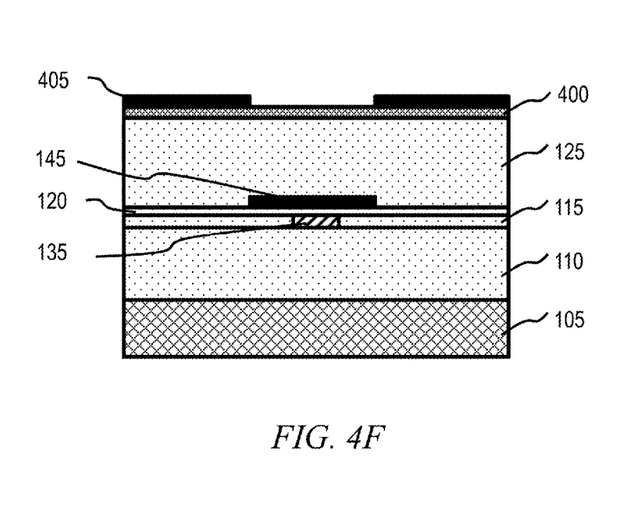

Subsequently, in step 325, a hard mask layer 405 is deposited on the polishing stop layer 400 to yield the film stack shown in FIG. 4E. The hard mask layer 405 is preferably formed of the same material as the etch stop feature 145 (e.g., silicon nitride).

In step 330, the hard mask layer 405 is patterned to form an opening defining the position of the trench that will eventually contain the waveguide coupler feature 140. The patterned hard mask layer 405 is visible in the film stack shown in FIG. 4F. The opening in the hard mask layer 405 may be formed by photolithography and RIE. Here, the RIE process preferably has a relatively high etch rate in the material forming the hard mask layer 405 (e.g., silicon nitride) and a relatively low etch rate in the photoresist and the material forming the polishing stop layer 400 (e.g., DLC). Advantageously, the same photolithography mask used to define the etch stop feature 145 in step 310 may be utilized in step 330, except with a different polarity of photoresist.

Figure 4G:
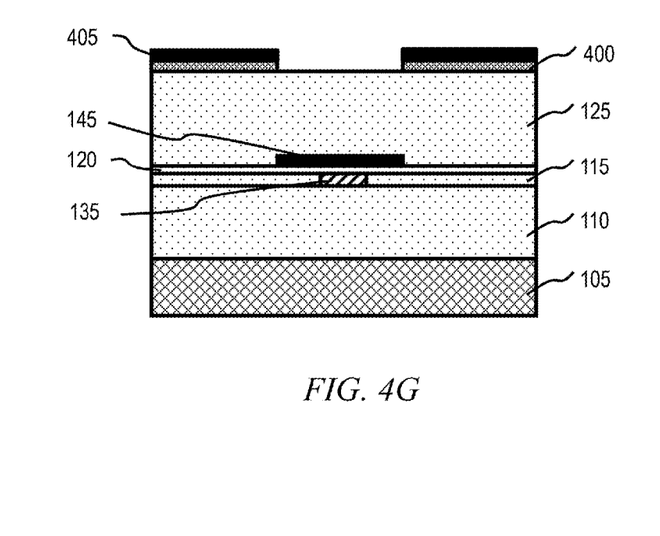

Then, in step 335, the exposed portion of the polishing stop layer 400 is etched utilizing the hard mask layer 405 as a hard mask. This acts to replicate the opening in the hard mask layer 405 in the polishing stop layer 400. Etching may again be by a RIE process, with the RIE process preferably having a relatively high etch rate in the material forming the polishing stop layer 400 (e.g., DLC), and a relatively low etch rate in the materials forming the hard mask layer 405 (e.g., silicon nitride) and the fourth dielectric layer 125 (e.g., silicon oxide). The resultant film stack is shown in FIG. 4G.

Figure 4H:
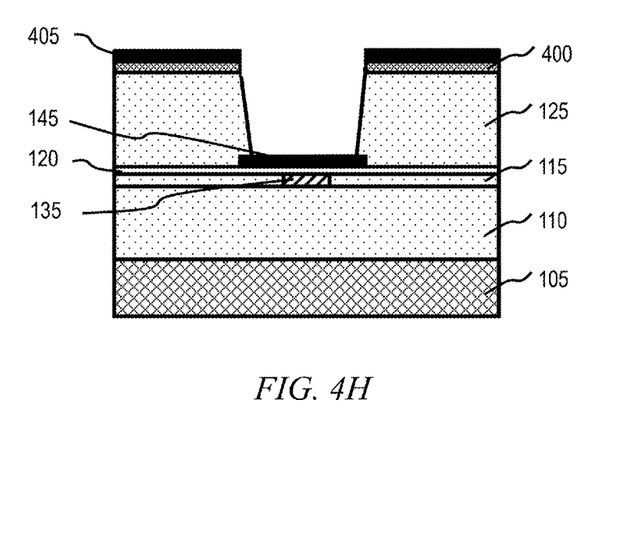

The trench is further enlarged in step 340, wherein the fourth dielectric layer 125 is etched utilizing the hard mask layer 405 as a hard mask and the etch stop feature 145 as a etch stop. Step 340 may also be performed by RIE, with the RIE preferably having an relatively high etch rate in the material forming the fourth dielectric layer 125 (e.g., silicon oxide) and a relatively low etch rate in the material forming the hard mask layer 405 and the etch stop feature 145 (e.g., silicon nitride). Advantageously, having the etch stop layer placed as shown in the figures acts to stop the RIE process from damaging the underlying third dielectric layer 120, which will ultimately separate the waveguide coupler feature 140 from the optical waveguide feature 135. The resultant film stack is shown in FIG. 4H.

Figure 4I:
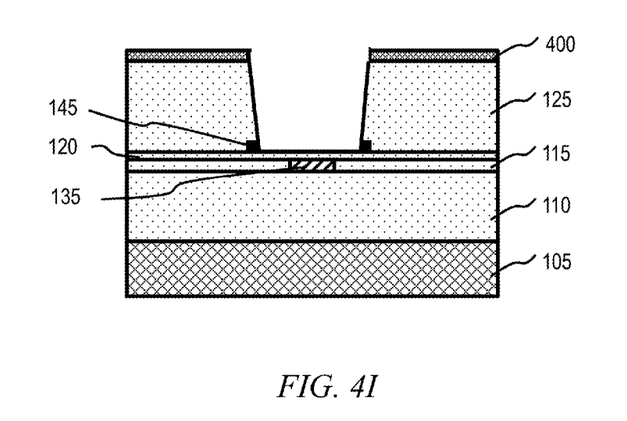

Subsequently, in step 345, the hard mask layer 405 and the exposed portion of the etch stop feature 145 are etched away, yielding the film stack shown in FIG. 4I. Here again RIE may be utilized, with the RIE process preferably having a relatively high etch rate in the material forming the hard mask layer 405 and the etch stop feature 145 (e.g., silicon nitride), and a relatively low etch rate in the materials forming the polishing stop layer 400 (e.g., DLC) and the third dielectric layer 120 (e.g., silicon oxide).

Figure 4J:
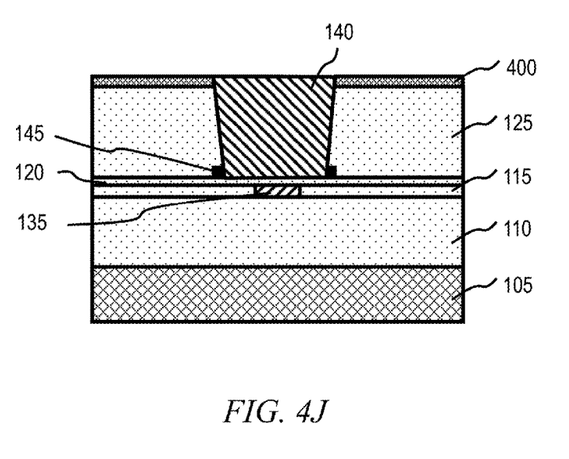

At this point in the method 300, the trench is fully formed and ready to receive the waveguide coupler feature 140. In step 350, a layer of material for the waveguide coupler feature 140 is deposited onto the film stack (and into the trench), and then, in step 355, the resultant film stack is planarized utilizing the polishing stop layer 400 as a polishing stop. The deposition may be by, for example, CVD, while the planarization may be by CMP. The resultant film stack is shown in FIG. 4J. As a result of polishing the film stack down to the polishing stop layer 400, the waveguide coupler feature 140 only remains present in the trench.

Figure 4K:
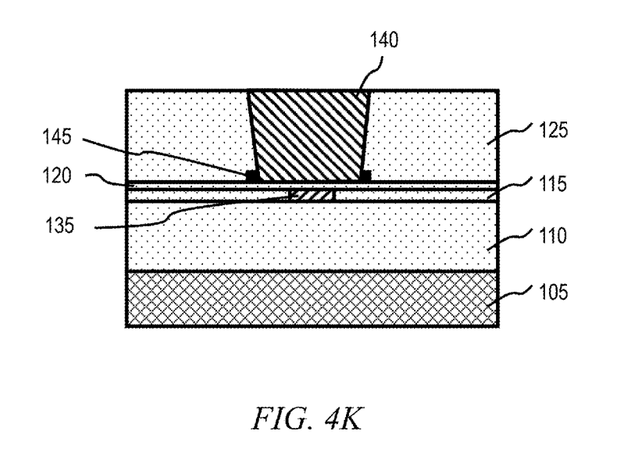

Step 360, in turn, involves etching away the polishing stop layer 400, yielding the film stack shown in FIG. 4K. The etching may be by RIE. Here, the RIE preferably has a relatively uniform etch rate in the material forming the polishing stop layer 400 (e.g., DLC) and the material forming the waveguide coupler feature 140 (e.g., silicon oxynitride). The result is that the film stack remains substantially planar after the RIE processing, as indicated in the figure.

Finally, in step 365 of the method 300, the fifth dielectric layer 130 (e.g., silicon oxide) is deposited on the film stack. Deposition may again be by CVD. This yields the integrated circuit 100 shown in FIGS. 1A and 1B.

It should again be emphasized that the above-described embodiments of the invention are intended to be illustrative only. Other embodiments may, for example, utilize different processing steps from those set forth above to achieve embodiments falling within the scope of the invention. For example, the CMP-based processing steps set forth above may, in several instances, be replaced by RIE-based processing. Moreover, one or more of the RIE-based processes described above may be replaced by alternative dry etching techniques such as ion beam etching. Lastly, one or more of the CVD-based processing steps set forth above may be replaced by other forms of deposition including, but not limited to, physical vapor deposition (PVD) and atomic layer deposition (ALD). These numerous alternative embodiments within the scope of the appended claims will be apparent to one skilled in the art.

The method 300 as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in 35 U.S.C. § 112, ¶6. In particular, the use of "step of" in the claims herein is not intended to invoke the provisions of 35 U.S.C. § 112, ¶6.

What is claimed is:

1. A film stack comprising:
   an optical waveguide feature;
   a lower dielectric layer covering the optical waveguide feature;
   a waveguide coupler feature disposed over at least a portion of the optical waveguide feature with the waveguide coupler feature entirely separated from the optical waveguide feature by a portion of the lower dielectric layer so that no part of the waveguide coupler feature directly contacts the optical waveguide feature; and an upper dielectric layer flanking at least a portion of the waveguide coupler feature and in direct contact with the waveguide coupler feature;

wherein the waveguide coupler feature is characterized by a refractive index higher than the lower dielectric layer and the upper dielectric layer.

2. The film stack of claim 1, wherein the optical waveguide feature consists essentially of silicon or silicon nitride.

3. The film stack of claim 1, wherein the lower dielectric layer and the upper dielectric layer consist essentially of silicon oxide.

4. The film stack of claim 1, wherein the waveguide coupler feature consists essentially of silicon oxynitride.

5. The film stack of claim 1, wherein at least a portion of the waveguide coupler feature has a refractive index greater than about 1.45.

6. The film stack of claim 1, further comprising an etch stop feature flanking at least a portion of the waveguide coupler feature.

7. The film stack of claim 6, wherein the etch stop feature consists essentially of silicon nitride.

8. The film stack of claim 1, wherein the waveguide coupler feature is characterized by a height greater than that of the optical waveguide feature.

9. The film stack of claim 1, wherein the waveguide coupler feature is able to receive light signals from the optical waveguide feature.

10. The film stack of claim 1, wherein the waveguide coupler feature is able to transmit light signals to the optical waveguide feature.

11. The film stack of claim 1, further comprising:
a substrate; and
a base dielectric layer separating the optical waveguide feature from the substrate.

12. An integrated circuit comprising:
an optical waveguide feature;
a lower dielectric layer covering the optical waveguide feature;
a waveguide coupler feature disposed over at least a portion of the optical waveguide feature with the waveguide coupler feature entirely separated from the optical waveguide feature by a portion of the lower dielectric layer so that no part of the waveguide coupler feature directly contacts the optical waveguide feature; and an upper dielectric layer flanking at least a portion of the waveguide coupler feature and in direct contact with the waveguide coupler feature;

wherein the waveguide coupler feature is characterized by a refractive index higher than the lower dielectric layer and the upper dielectric layer.

13. The integrated circuit of claim 12, wherein the waveguide coupler feature terminates in an edge of the integrated circuit.

14. The integrated circuit of claim 12, wherein the waveguide coupler feature consists essentially of silicon oxynitride.

15. A system including an integrated circuit, the integrated circuit comprising:
an optical waveguide feature;
a lower dielectric layer covering the optical waveguide feature;
a waveguide coupler feature disposed over at least a portion of the optical waveguide feature with the waveguide coupler feature entirely separated from the optical waveguide feature by a portion of the lower dielectric layer so that no part of the waveguide coupler feature directly contacts the optical waveguide feature; and an upper dielectric layer flanking at least a portion of the waveguide coupler feature and in direct contact with the waveguide coupler feature;

wherein the waveguide coupler feature is characterized by a refractive index higher than the lower dielectric layer and the upper dielectric layer.

16. The system of claim 15, wherein the waveguide coupler feature terminates in an edge of the integrated circuit.

17. The system of claim 15, further comprising an off-chip device distinct from the integrated circuit and aligned with the waveguide coupler feature so as to be operative to receive light signals from the waveguide coupler feature.

18. The system of claim 17, wherein the off-chip device comprises at least one of an optical fiber, a laser, a light emitting diode, a photodetector, and an optical amplifier.

19. The system of claim 15, further comprising an off-chip device distinct from the integrated circuit and aligned with the waveguide coupler feature so as to be operative to transmit light signals to the waveguide coupler feature.

20. The system of claim 19, wherein the off-chip device comprises at least one of an optical fiber, a laser, a light emitting diode, a photodetector, and an optical amplifier.

\* \* \* \* \*